United States Patent
Tehranchi et al.

(10) Patent No.: US 9,317,986 B2
(45) Date of Patent: *Apr. 19, 2016

(54) MOVABLE BARRIER OPERATOR CONFIGURED FOR REMOTE ACTUATION

(71) Applicant: VIKING ACCESS SYSTEMS, LLC, Irvine, CA (US)

(72) Inventors: Ali Tehranchi, Irvine, CA (US); Pezhman Karimi, Irvine, CA (US); Daniel Perez, Irvine, CA (US)

(73) Assignee: Viking Access Systems, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,599

(22) Filed: Jun. 3, 2015

(65) Prior Publication Data

US 2015/0269796 A1 Sep. 24, 2015

Related U.S. Application Data

(63) Continuation of application No. 14/621,250, filed on Feb. 12, 2015.

(60) Provisional application No. 62/084,471, filed on Nov. 25, 2014, provisional application No. 61/939,118, filed on Feb. 12, 2014.

(51) Int. Cl.
*G07C 9/00* (2006.01)
*H04W 4/00* (2009.01)
(Continued)

(52) U.S. Cl.
CPC .......... *G07C 9/00309* (2013.01); *G06F 21/604* (2013.01); *G07C 9/00007* (2013.01); *G07C 9/00103* (2013.01); *G07C 9/00111* (2013.01); *H04B 1/3822* (2013.01); *H04L 63/08* (2013.01); *H04W 4/008* (2013.01); *H04W 12/06* (2013.01); *H04W 12/08* (2013.01); *H04W 76/02* (2013.01); *H04W 76/023* (2013.01); *G07C 9/00031* (2013.01); *G07C 2009/00769* (2013.01); *G07C 2009/00793* (2013.01); *G07C 2009/00928* (2013.01); *G07C 2209/64* (2013.01); *H04W 84/12* (2013.01)

(58) Field of Classification Search
CPC .......... G07C 9/00007; G07C 9/00309; G07C 9/00111; G07C 9/00103; G07C 2209/64; G07C 2009/00769; G07C 9/00031; G07C 2009/00793; G07C 2009/00928; H04W 12/08; H04W 4/008; H04W 76/02; H04W 12/06; H04W 76/023; H04W 84/12; H04B 1/3822; G06F 21/604; H04L 63/08
USPC ................................. 340/5.61, 5.72
See application file for complete search history.

(56) References Cited

U.S. PATENT DOCUMENTS

2007/0143499 A1* 6/2007 Chang .......................... 709/245
2008/0130791 A1* 6/2008 Fitzgibbon .................... 375/310
(Continued)

*Primary Examiner* — Edwin Holloway, III
(74) *Attorney, Agent, or Firm* — Jafari Law Group, Inc.

(57) ABSTRACT

The present invention is generally a movable barrier operator configured for remote actuation, and more specifically, to a movable barrier operator configured to generate a barrier command in response to an authorized mobile device joining wireless network. The authorization may be established by connecting the mobile device to the operator through a wireless communication means. The wireless communication means may include known protocols such as Bluetooth™, Wi-Fi, NFC, ZigBee™, or any other type of wireless communication.

20 Claims, 8 Drawing Sheets

(51) Int. Cl.
    *H04W 76/02*     (2009.01)
    *H04W 12/08*     (2009.01)
    *H04W 12/06*     (2009.01)
    *H04B 1/3822*     (2015.01)
    *G06F 21/60*     (2013.01)
    *H04L 29/06*     (2006.01)
    *H04W 84/12*     (2009.01)

(56) References Cited

U.S. PATENT DOCUMENTS

| | | | | |
|---|---|---|---|---|
| 2010/0283579 | A1* | 11/2010 | Kraus et al. | 340/5.7 |
| 2010/0305779 | A1* | 12/2010 | Hassan et al. | 701/2 |
| 2011/0311052 | A1* | 12/2011 | Myers et al. | 380/270 |
| 2013/0176107 | A1* | 7/2013 | Dumas et al. | 340/5.61 |
| 2015/0004903 | A1* | 1/2015 | Lyman | 455/41.1 |

\* cited by examiner

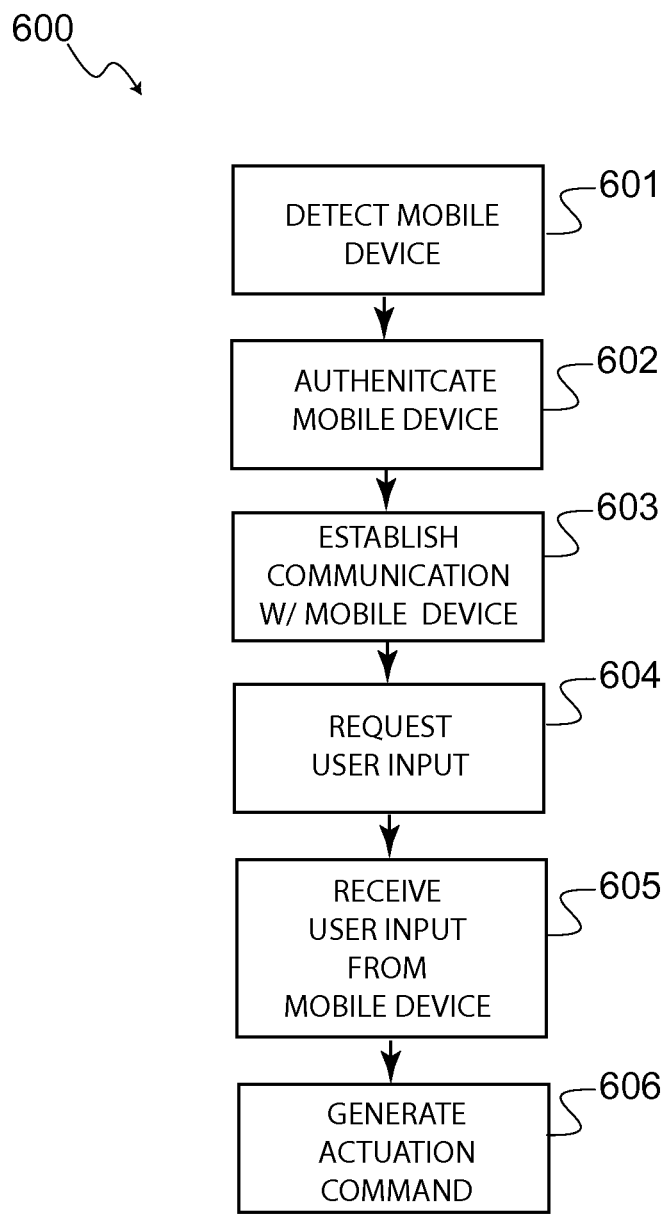

MOVABLE BARRIER OPERATOR CONFIGURED FOR REMOTE ACTUATION

TECHNICAL FIELD OF THE INVENTION

The present invention relates in general to a movable barrier operator configured for remote actuation, and more specifically, to a movable barrier operator configured to generate a barrier command in response to an authorized mobile device joining a wireless network.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Typically, access to a secure location, such as a gated area, building, parking structure or walkway, has been controlled remotely by devices including remote controls and the like. Some of these devices include a keypad for inputting a passcode, a radio transmitter, and sometimes other devices that include use of biometric information such as finger prints, a user's iris, voice or facial characteristics. All of these devices require additional expensive equipment, and some of these devices require users to carry additional components to access the desired doorway or gate.

For example, vehicle access to barrier-controlled premises, such as a gated community, may require a radio transmitter. These devices do not typically form an integral part of the vehicle, but rather a separate remote control, which the driver must engage in order to activate a signal that commands the gate to open and grant access to the vehicle. Naturally, these devices may be lost, stolen or misplaced. Newer vehicle models offer radio transmitters integral with the vehicle, avoiding the need to have a separate radio transmitter or remote control. Nevertheless, the user is required to press a button when approaching the gate or movable barrier that ultimately grants access to the premises. More importantly, users inviting guests to the premise cannot share these remote access capabilities, and usually depend on additional means of granting access to their guests.

Similarly, access to secured premises may require access keys. These often prove expensive and may be easily lost or stolen. Furthermore, managing who carries the access key with authorization to enter through a restricted area is exceedingly difficult, as access keys may be shared or misplaced and used by an unauthorized party.

Therefore, there is a need in the art for a more efficient means of enabling users with authorized access to a particular premises or location, which does not require the user to carry with them keys, remote controls, or require expensive components at each movable barrier in order to gain entry. Furthermore, there is a need to provide a means of enabling users with access privileges to share or delegate access privileges to other users without having to share or provide separate components like keys or remote controls. It is to these ends that the present invention has been developed.

BRIEF SUMMARY OF THE INVENTION

To minimize the limitations in the prior art, and to minimize other limitations that will be apparent upon reading and understanding the present specification, the present invention describes a movable barrier operator configured for remote actuation from a mobile device. The movable barrier operator may be configured to generate a barrier actuation command in response to an authorized mobile device joining an existing common wireless network.

A movable barrier operator system, in accordance with one embodiment of the present invention comprises: a mobile device; a movable barrier; a local wireless network; and a movable barrier operator connected to the local wireless network and configured to control the movable barrier, the movable barrier operator including a processor, a memory, and one or more programs stored in the memory to be executed by the processor, the one or more programs including: instructions for detecting the mobile device whenever the mobile device is within a programmable proximity of the movable barrier; instructions for broadcasting an invitation for the mobile device to join the local wireless network; instructions for receiving an access request accepting the invitation to join the local wireless network from the mobile device; and instructions for generating a movable barrier actuation command in response to the mobile device joining the local wireless network.

A movable barrier operator system, in accordance with one embodiment of the present invention comprises: a movable barrier; a local wireless network; a server for managing access to the movable barrier, the server connected to the local wireless network; and a movable barrier operator, including: a motor configured to control the movable barrier, a network interface connecting the movable barrier operator to the local wireless network, and a controller connected to the network interface and the motor, the controller configured to generate a barrier actuation command in response to an authorized mobile device joining the local wireless network.

A movable barrier operator, in accordance with one embodiment of the present invention comprises: a wireless network interface for communicating with a local wireless network; a motor configured to control a movable barrier; a controller configured to operate the motor and communicate with the wireless network interface, the controller including a processor, a memory, and one or more programs stored in the memory to be executed by the processor, the one or more programs including: instructions for detecting a mobile device whenever the mobile device is within a programmable proximity of the movable barrier; instructions for broadcasting an invitation for the mobile device to join the local wireless network; instructions for receiving an access request accepting the invitation to join the local wireless network from the mobile device; and instructions for generating a movable barrier command in response to the mobile phone joining the local wireless network.

A system for operating a movable barrier from a vehicle, in accordance with the present invention, comprises: a vehicle onboard computer including a wireless network interface configured to connect to a local wireless network, the vehicle onboard computer including one or more sets of programmable instructions for: detecting an access point to the local wireless network, and requesting access to the local wireless network whenever the vehicle onboard computer is within a programmable proximity to the access point; and a movable barrier operator including: a motor mechanically connected to the movable barrier, and a controller configured to operate the motor and communicate with the local wireless network, the controller including a processor, a memory, and one or more programs stored in the memory to be executed by the processor, the one or more programs for: broadcasting an invitation to join the local wireless network via the access point; receiving an access request from the vehicle onboard computer within a programmable proximity to the access point; and generating a movable barrier actuation command in response to the vehicle onboard computer joining the local wireless network.

Another system for operating a movable barrier, in accordance with the present invention, comprises: a movable barrier; a local wireless network; a server for managing access to the movable barrier, the server connected to the local wireless network; an access point for providing wireless access to the local wireless network; a movable barrier operator, including: a motor configured to control the movable barrier, a network interface connecting the movable barrier operator to the local wireless network, and a controller connected to the network interface and the motor, the controller configured to generate a barrier actuation command in response to an authorized mobile device joining the local wireless network.

A method for remotely controlling a movable barrier, in accordance with the present invention, comprises: transmitting, from an access point in proximity to the movable barrier, an invitation to join a local wireless network; receiving, from a mobile device, a request to join the local wireless network, wherein the access request includes authorization credentials; providing the mobile device with access to the local wireless network upon verification of the authorization credentials; and automatically generating a movable barrier command in response to the mobile phone joining the local wireless network.

It is an objective of the present invention to provide a movable barrier operator configured for remote actuation from an onboard computer residing in a vehicle.

It is another objective of the present invention to provide a movable barrier operator configured for remote actuation from a smartphone.

It is yet another objective of the present invention to provide a user interface that facilitates authorization to access a premise.

It is yet another objective of the present invention to eliminate the need for access keys, remote controls, or other additional components in order to actuate a movable barrier operator.

These and other advantages and features of the present invention are described herein with specificity so as to make the present invention understandable to one of ordinary skill in the art.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry may not be depicted in order to provide a clear view of the various embodiments of the invention.

FIG. 5(*b*) is a flowchart depicting one method for remotely actuating a movable barrier in accordance with the present invention, wherein the operator establishes a wireless communication for authorization of a mobile device, the mobile device configured as a wireless access point.

FIG. 6 is a flowchart depicting one method for remotely actuating a movable barrier in accordance with the present invention, wherein the operator establishes a wireless communication for authorization of a mobile device, and wherein the operator may require a user input prior to generating an actuation command to open the barrier.

DESCRIPTION OF THE INVENTION

Figure 1:
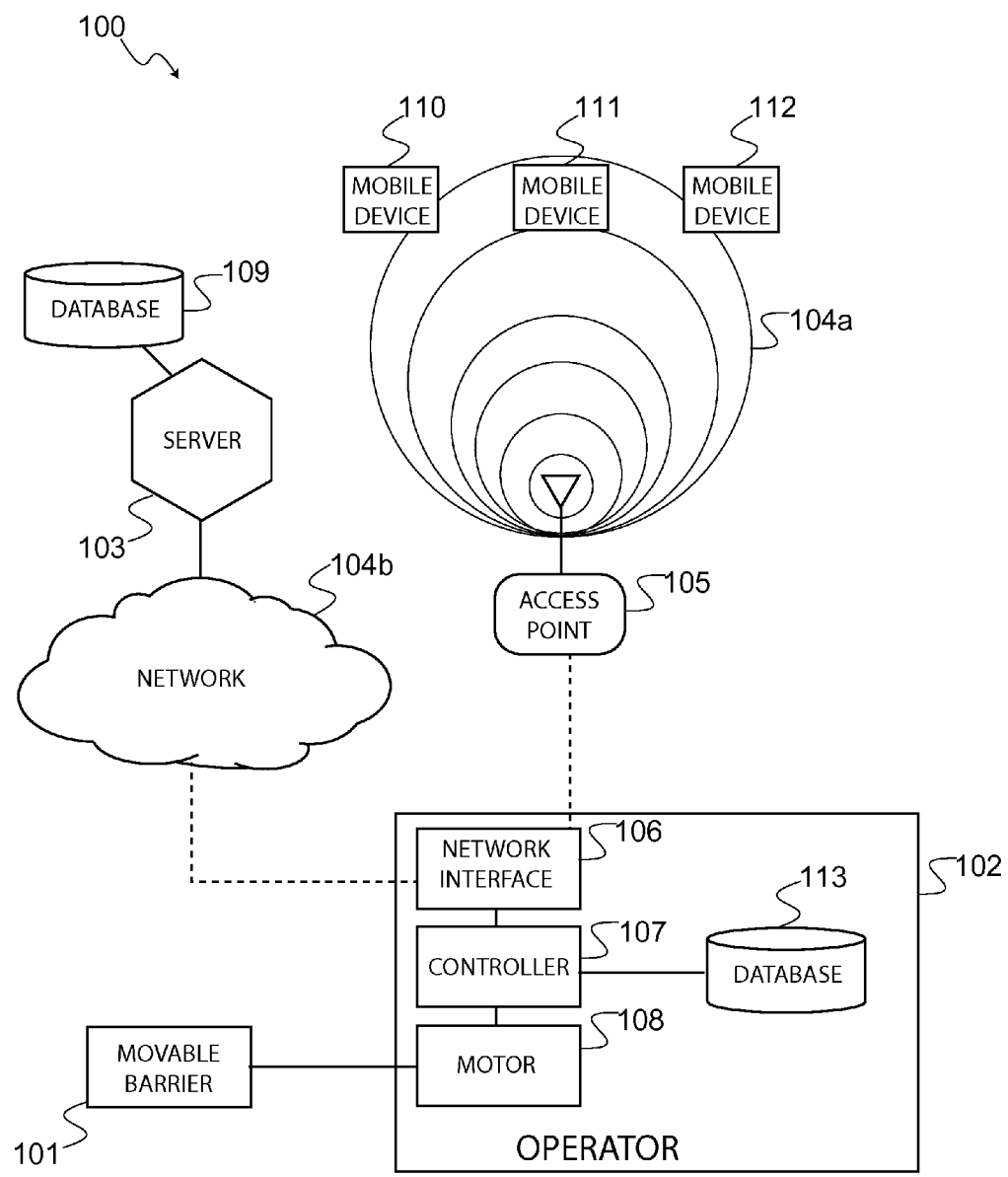
FIG. 1 depicts a system in accordance with the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

In the following detailed description, a movable barrier operator system may be any system that controls a barrier to an entry, an exit, or a view. The barrier could be a door for a small entity (i.e. a person), or a gate for a large entity (i.e. a vehicle), which may swing, slide, roll upwards, lock, unlock, or achieve any other type of action suitable to control access through the barrier. The operator, which controls the barrier, may move the barrier from an open position to a closed position and vice-versa, or simply provide a means to lock and unlock the barrier. The operator may be automatic and may be controlled locally or remotely. Additionally, an operator may comprise one or more motors for moving one or more barriers or a locking mechanism for locking and unlocking one or more doorways. Furthermore, in the present disclosure, the term motor is defined broadly and may be a device that creates motion, a machine that converts electricity into a mechanical motion, a mechanical or electromagnetic device for moving or controlling a mechanism or system, and may include without limitation, an electric motor, an actuator, hydraulics, pneumatics, mechanical locks, or even electromagnetic locks. Electromagnetic locks may comprise of a solenoid, magnetic lock or strike, an electromagnet and armature plate, or any other locking means. Electromagnetic locks may include fail safe electromagnetic devices that are unlocked when de-energized, or fail secure electromagnetic devices that remain locked when power is lost.

Generally, the present invention involves a movable barrier system, which may include a movable barrier operator configured with a network interface to communicate with a mobile device such as a smartphone or an onboard computer of a vehicle. The mobile device may be configured to communicate with the operator via a local wireless network, or establish a connection with the local wireless network; the operator may further be configured to receive a signal when the mobile device has joined the local wireless network, and generate a movable barrier command that controls the movable barrier. The command to control the barrier may be automatically generated, or one or more security prompts may be requested of the mobile device via a user interface. The user interface may be a graphical user interface (GUI) provided via a smartphone application or an application for vehicle onboard computers. The GUI may alert the user to input a password, an access key, or a biometric input (e.g. fingerprint) in order to generate the authorization code. Moreover, the system may include a server that hosts the local wireless network, or a server on a wide area network that can access the movable barrier operator. The server may include a database and a GUI for managing the system, or a GUI that allows access to a local database on the operator. For example, the GUI may allow for authorizations to be delegated and revoked from the server; new users may be added or deleted; security levels may be administered for each user; and other parameters may be altered or otherwise managed remotely. Since each mobile device must provide the system with an authorization code in order to join the local wireless network, a system manager may revoke or limit permissions to mobile devices from the centralized server.

In exemplary embodiments, the operator itself includes a storage module with a local database, eliminating the need for a server altogether. In such embodiments, the GUI on an authorized mobile device may be used to access the database and manage the system. The local wireless network may use any number of known technologies such as Wi-Fi™, Bluetooth™, ZigBee™, near field communication (NFC), or any other known protocol to establish a wireless personal area network (WPAN) or any suitable network which may be joined by a mobile device such as a smartphone, a tablet, a vehicle onboard computer or any other mobile device users normally utilize from day to day. To join the network, the system may include one or more access points, which may use the same or different protocol to communicate with the mobile device and facilitate the connection between the mobile device and the WPAN.

Turning now to the figures, FIG. 1 depicts a system, in accordance with the present invention, which includes a movable barrier operator configured to generate a barrier command in response to an authorized mobile device joining an existing wireless network. More specifically, FIG. 1 shows system 100, which includes a movable barrier (barrier 101), a movable barrier operator (operator 102), server 103, a wireless network such as a WPAN (network 104a), a wide area network (network 104b), and an access point (AP 105).

Barrier 101 may be any type of barrier as mentioned above. For example, barrier 101 may be a doorway to a walkway, a room, or a storage space; barrier 101 may be a gate to a gated community, a parking structure, or any secured area. In one embodiment, barrier 101 is a sliding gate; in another embodiment, barrier 101 is a swing gate; in yet another embodiment, barrier 101 may be a lockable doorway inside a building or a lockable gate on a walkway.

Operator 102 may be any type of movable barrier operator suitable to actuate, operate, or otherwise control access via barrier 101. Thus, operator 102 may be a swing gate operator that swings open, a sliding gate operator that moves a gate on a track, a locking mechanism that locks and unlocks a door to an entry, or any other type of operator suitable for controlling the type of movable barrier that may be implemented with system 100. Typically, operator 102 may include network interface 106, controller 107, and motor 108.

Operator 102 is configured to communicate with mobile devices 110, 111, and 112 via a network 104a, which is typically a local wireless personal area network (WPAN) built with known technologies such as ZigBee™, Bluetooth™, Wi-Fi™, NFC, or any other suitable protocols for establishing a short ranged communication between operator 102 and mobile devices 110, 111, 112. In some embodiments, operator 102 is also configured to communicate with server 103 via a wide area network such as network 104b. Network 104b may be, for example, the World Wide Web. While some applications of the present invention may not require server 103, other applications may benefit as server 103 may provide a remote means of backing up database 109, or managing system 100 without having to be in proximity to operator 102.

Server 103 may include one or more computers suitable for connecting to network 104b and remotely accessing operator 102. Server 103 typically includes a user interface that facilitates management of system 100 as well as database 109, which holds user information associated with authorized mobile devices that may be provided access via barrier 101. In some embodiments, database 109 is a back-up database of database 113, which is stored locally at operator 102. In such embodiments, server 103 may be accessed by an administrator to manage database 113 from a remote location. In yet other embodiments, operator 102 does not include a local database 113, and system 100 relies solely on a remote database 109. In yet other embodiments, server 103 and database 109 are not required at all, and operator 102 merely relies on a local database such as database 113. These various embodiments will be discussed further below.

Network 104a is typically a WPAN, as mentioned above, and may implement any number of known technologies. Typically, an access point, such as AP 105 may be implemented within a proximity to operator 102. Mobile devices, such as mobile device 110, 111, and 112, may be detected or otherwise detect AP 105 when within a programmable range. Network 104a thus allows authorized mobile devices to communicate with operator 102.

Network 104b is typically a wide area network, as mentioned above, for example the World Wide Web. Network 104b may be a means to remotely access operator 102 in order to manage system 100 and perform maintenance such as back-up a database, update, and or change permissions for operator 102.

AP 105 may be any type of access point suitable for connecting mobile devices 110, 111, and 112 to operator 102 via network 104a. As such, AP 105 may utilize known protocols such as Wi-Fi™, Bluetooth™, ZigBee™, NFC, or any other suitable protocol that enables mobile devices to join network 104a.

Network interface 106 may be a wired or wireless network interface; in one embodiment, AP 105 may be a separate component from network interface 106; in another embodiment, AP 105 and network interface 106 may comprise a single component. Typically however, network interface 106 may communicate with AP 105 in order to detect when an authorized device has joined network 104a. For example, and without limiting the scope of the present invention, in one embodiment, AP 105 may utilize a well known protocol such as Bluetooth™ to detect a mobile device within a predetermined proximity. Once in range, an invitation to join the network 104a may be provided to the mobile device via AP 105. This invitation may include an authorization protocol or a security protocol in order to verify that the mobile device has permissions to enter or pass through barrier 101. As such, AP 105 may be configured to connect authorized mobile devices to network 104a using well known means. Network interface 106 may be configured to alert controller 107 when the mobile device has joined the network. In turn, controller 107 may generate a desired command for motor 108 to operate barrier 101.

System 100 may use signal strength indication (RSSI) to determine the proximity of the mobile device, and based upon pre-programmed parameters, determine when it is appropriate to provide access via barrier 101. For example, and without deviating from the scope of the present invention, AP 105 and/or network interface 106 may implement RSSI in order to provide users with a programmable means of determining a desirable distance at which a command to control barrier 101 may be generated by controller 107 of operator 102. This would prevent undesirable situations in which an authorized mobile device opens or unlocks a barrier of system 100 unintentionally due to passing within range of AP 105.

Controller 107 may comprise of one or more processors configured to access and process a set of instructions in a program code stored in a programmable memory of operator 102. As such, the one or more processors of controller 107 may run or execute the one or more set of instructions stored in the programmable memory in order to perform the various functions of operator 102. For example, controller 107 may processes, relay, or carry out either pre-programmed or user-entered instructions for detecting the mobile device whenever the mobile device is within a programmable proximity of the movable barrier; instructions for broadcasting an invitation for the mobile device to join network 104a; instructions for receiving an access request accepting the invitation to join network 104a from the mobile device; instructions for generating a movable barrier command in response to the mobile device joining network 104a; and any other type of instructions suitable for achieving typical functions of a movable barrier operator. In the present description, a movable barrier command may refer to: an activation of the motor that may cause movement of the barrier; an activation of the motor that may cause locking of the barrier; an activation of the motor that may cause unlocking of the barrier; or any other command that achieves a typical function of a movable barrier operator.

Motor 108 may be any motor suitable for controlling a movement or function of barrier 101. As such, motor 108 may cause barrier 102 to slide, swing, roll, lock, unlock, or perform the function for which barrier 101 has been designed. For example, and without limiting the scope of the present invention, operator 102 may receive a signal indicating that mobile device 110 has joined network 104a via AP 105. Operator 102 may generate a barrier command in response to this signal in order to unlock barrier 101, which may comprise a doorway. In such embodiment, motor 108 may be a locking mechanism that locks and unlocks barrier 101.

Database 109 typically stores user and/or device information associated with mobile devices that are authorized to use system 100. Thus, database 109 may be a simple list of user authorization codes, passwords, MAC addresses, or any other information associated with the authorized mobile devices of system 100, which may be updated by a system administrator from time to time. To these ends, server 103 may include a software component such as a GUI with access to database 109 in order to manage authorized users and client mobile devices.

In one embodiment, as mentioned above, database 109 and server 103 are not required at all and system 100 relies solely on database 113 to store a list of authorized users and associated mobile devices. In other embodiments, database 109 may be a back-up database used to manage system 100 from a remote location via network 104b (i.e. the Wireless World Wed). In such embodiment, database 109 may be managed and synchronized with a local database 113. This may allow a user with administrative permissions to update a list of authorized users, update user permissions, or otherwise manage database 113.

Database 113 may be a locally stored database that may be accessed by controller 107 of operator 102. As with database 109, database 113 typically stores user and/or device information associated with mobile devices that are authorized to use system 100. Thus, database 113 may be a simple list of unique identifiers associated with one or more mobile device, authorization codes, passwords, MAC addresses, or any other information associated with the authorized mobile devices of system 100, which may be updated by a system administrator from time to time. Furthermore, database 113 may include temporary user identification codes associated with one or more mobile devices that may be granted access on a temporary basis. Also, database 113 may include a historical data or a history of devices that have accessed barrier 101, including the dates and times each device has accessed barrier 101. Also, database 113 may include profiles for each user or profiles associated with one or more mobile devices wherein each profile contains user permissions associated with a level of access to one or more barriers of system 100.

Database 113 may be managed remotely (i.e. from a computer such as server 103 via network 104b), or locally from a mobile device with administrative privileges. To these ends, a mobile device with administrative permissions may include a software component such as a GUI with access to database 113 in order to manage authorized users and client mobile devices.

Mobile devices 110, 111, and 112 may also implement a software component in order to facilitate implementation of security protocols for system 100, including providing each device with permissions to access barrier 101. Such software component provides system 100 a means to obtain user or device identification from each mobile device and provides authorized users with the right access code, password, or any other means of authorization verification to facilitate the user's access via barrier 101. The software component may range in complexity: in some embodiments, a simple application for storing an authentication means on the mobile device 110 may be implemented. An administrator of system 100 may provide a user of mobile device 110 with the application, including the authentication means. The authentication means may include a password, access code, a unique identifier, a user identification code, a temporary unique identification code, or any other means of identifying and authenticating a mobile device 110. Other more complex applications may include a GUI that enables the mobile device user with options to further more stringent security protocols or have access to administrative information of system 100.

In one embodiment, more stringent security protocols may be implemented by automatically launching the GUI whenever mobile device 110 enters a predefined range from an access point such as AP 105. The GUI may launch a screen displaying a request to input information to further identify the user of the mobile device (See FIG. 10, for example).

In another embodiment, access to administrative information of system 100 may be provided via mobile device 110 by providing a GUI configured to display historical data and settings options that allow a user to manage system 100 parameters (See FIG. 9, for example).

The software component of system 100, whether available at the server, via mobile devices or both, may also include a variety of functions to help manage system 100. For example, and without deviating or limiting the scope of the present invention, a software component may provide the following functions: displaying historical data showing which mobile devices access barrier 101 and the dates and times that access occurred; issuing a request granting access or generating opening commands (i.e. to unlock or open a barrier) directly from server 103 or mobile device 110; locking a particular movable barrier such as a gate, a doorway or a window; setting system parameter such as timers for locking mechanisms, or timers to maintain a barrier open. For example, a user with administrative privileges may access select a time during which to keep barrier 101 opened or accessible to users—this may include a 7-day timer for unlocking barrier 101 (a doorway) during business hours, a 5-day timer, for locking and unlocking the doorway during certain days, or any other timer that helps the system administrator manage access through barrier 101.

By implementing the software component with system 100, authorization to gain access via barrier 101 may be shared with multiple devices and managed at any time. Each device may be individually authorized or de-authorized depending on the administrator's needs without having to re-program a common access code or requiring a user to return an access key-as is typically the case with traditional access systems.

Figure 2:
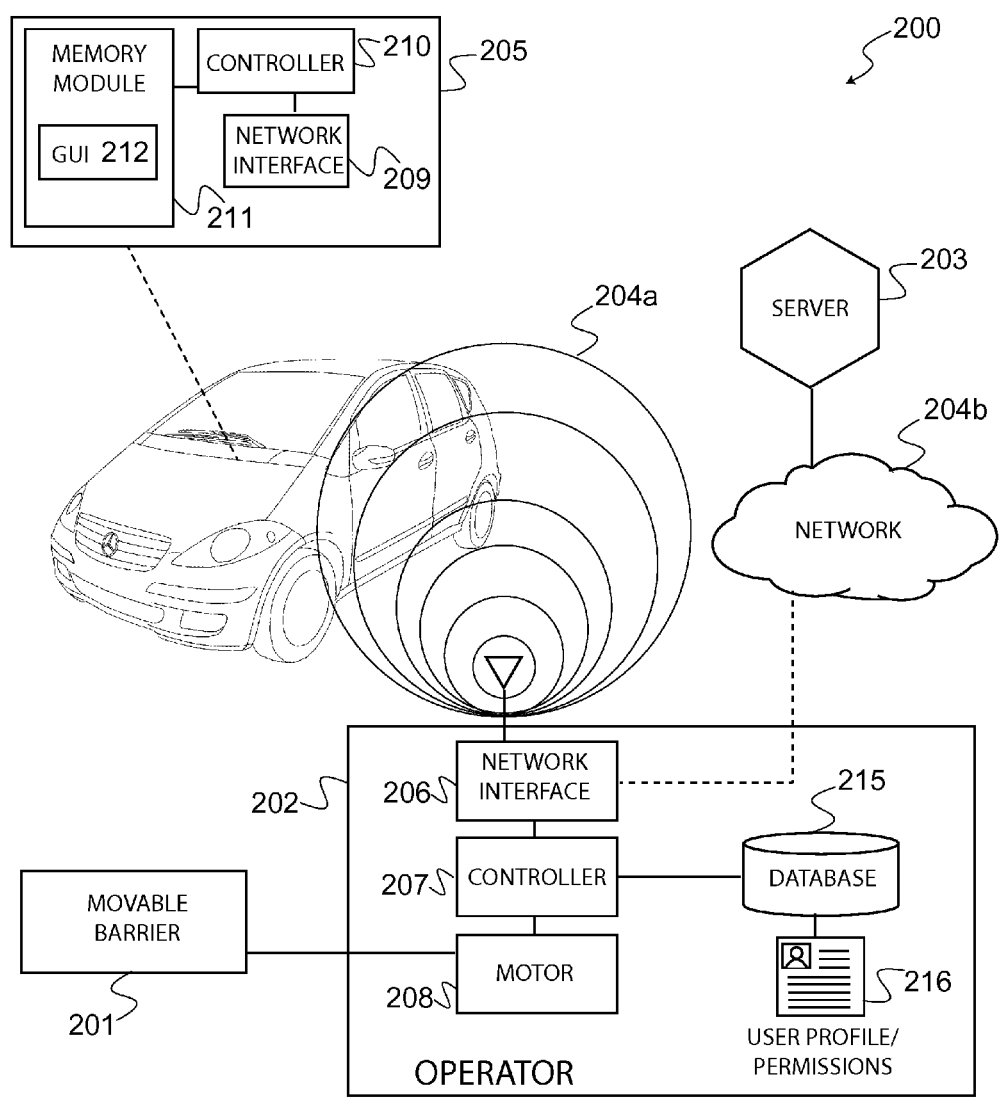
FIG. 2 depicts a system in accordance with one embodiment of the present invention wherein the mobile device comprises a vehicle onboard computer and the operator comprises a gate operator.

Turning to FIG. 2, a system in accordance with one embodiment of the present invention is illustrated; in this embodiment, the mobile device comprises a vehicle onboard computer and the operator comprises a gate operator. More specifically, FIG. 2 shows system 200, which includes a movable barrier (barrier 201), a movable barrier operator (operator 202), and a vehicle onboard computer (device 205); Operator 202 includes network interface 206, which may be configured to communicate with device 205 via a WPAN such as network 204a, and may also be configured to communicate with server 203 via network 204b, which may be a wide access network such as the internet. System 200 is very similar to system 100, although system 200's designed is focused primarily for movable barrier systems used to control access to vehicles. As such, barrier 201 is typically a gate for controlling vehicle access and device 205 is typically a vehicle's onboard computer that has been configured to communicate with operator 202 via network 204a.

The components of system 200 may be similar to those of system 100. For example, operator 202 will similarly include network interface 206, controller 207, and motor 208, which is configured to move barrier 201. Network interface 206 of operator 201 is configured to allow discovery, detection, and connection with device 205.

Device 205 typically includes network interface 209, controller 210, and memory module 211, which stores executable instructions for providing a user interface—in the illustrated embodiment, the user interface comprises GUI 212, which may facilitate more stringent security protocols such as requiring a driver to enter an access code prior to generating a command to move barrier 202.

In this embodiment, the vehicle's onboard computer or device 205, may be configured to transmit and receive signals utilizing any number of protocols such as Bluetooth™, Wi-Fi™, NFC, ZigBee™ or any other similar communication means via network interface 209. As such, network interface 209 may be configured with the appropriate protocol to detect, discover, or otherwise establish a communication with network interface 206 of operator 202. For example, and without limiting the scope of the present invention, as the vehicle approaches barrier 201, the vehicle's onboard computer may receive an invitation continuously being broadcasted from operator 202; alternatively, a discovery mode may be implemented by device 205 in order to detect network 204a when within a desired proximity to network interface 206. Once the devices recognize each other (i.e. device 205 is authenticated and allowed to join the network or WPAN used by operator 202 to communicate with device 205), operator 202 may generate a barrier command that automatically moves barrier 201 in order to allow access through.

In other embodiments, an authentication algorithm may be engaged prior to generating a barrier command, wherein the user may be provided with a prompt via GUI 212 to provide authenticating information such as a passcode, a biometric input (e.g. fingerprint on sensor similar to those on modern smartphones), or any other input that authorizes operator 202 to generate the command to open barrier 201.

In other embodiments, operator 202 may use an RSSI value as mentioned above in order to avoid undesirable activation of operator 202. In this way, users can be prompted for passwords, or merely be granted access, only when device 205 enters within a desired proximity to the gate or barrier 201.

System 200 may include database 215 stored locally at operator 202, the database comprising of authorized user profiles 216 with each user including one or more associated mobile devices such as device 205, which have been authorized to access barrier 201. Profiles 216 may be updated, edited, and shared between one or more locations by accessing server 203, or in alternative embodiments, where system 200 does not implement server 203 nor require network 204b, a mobile device with administrative permissions may be used to access database 215 and make the desired adjustments to database 215.

In an embodiment that does not implement server 203, a mobile device with administrative permissions may include a smartphone or table configured to communicate with operator 202 via network 204a and access database 215 directly. Such mobile device may be used by a field technician, for example, who may also have access to administrative or management information such as historical data, and other parameters for controlling barrier 201.

In the embodiment shown, server 203 is implemented to access operator 202 via network 204a, which may be a local wireless network or a wide access network such as the World Wide Web. Server 203 may be useful for gated communities comprising many tenants, and particularly with premises that include more than one barrier and barrier operators. With server 203, each barrier operator may be updated with new users or list of authorized devices that may access the barriers of the premises. Furthermore, as mentioned above, server 203 may be used to store a backup of database 215.

Whether server 203 is implemented, or system 200 need not rely on such remote access to operator 202, in some embodiments, temporary user authorizations may be granted so that guests to a location may be provided with a temporary access. Similarly, any authorized user may be provided a time limit of authorization via a programmable or predetermined scheduled length of time, or predetermined expiration date for authorization. These and other functionalities may be provided to a user via the GUI or user interface. For example, and without limiting the scope of the present invention, the stored events, such as historical access data, or programmed authorizations and de-authorizations, may be provided to a user (e.g. maintenance or security personnel). The GUI may further include means of temporarily blocking one or more mobile devices associated with vehicles or users or temporarily granting access to one or more mobile devices associated with vehicles or users.

Figure 3:
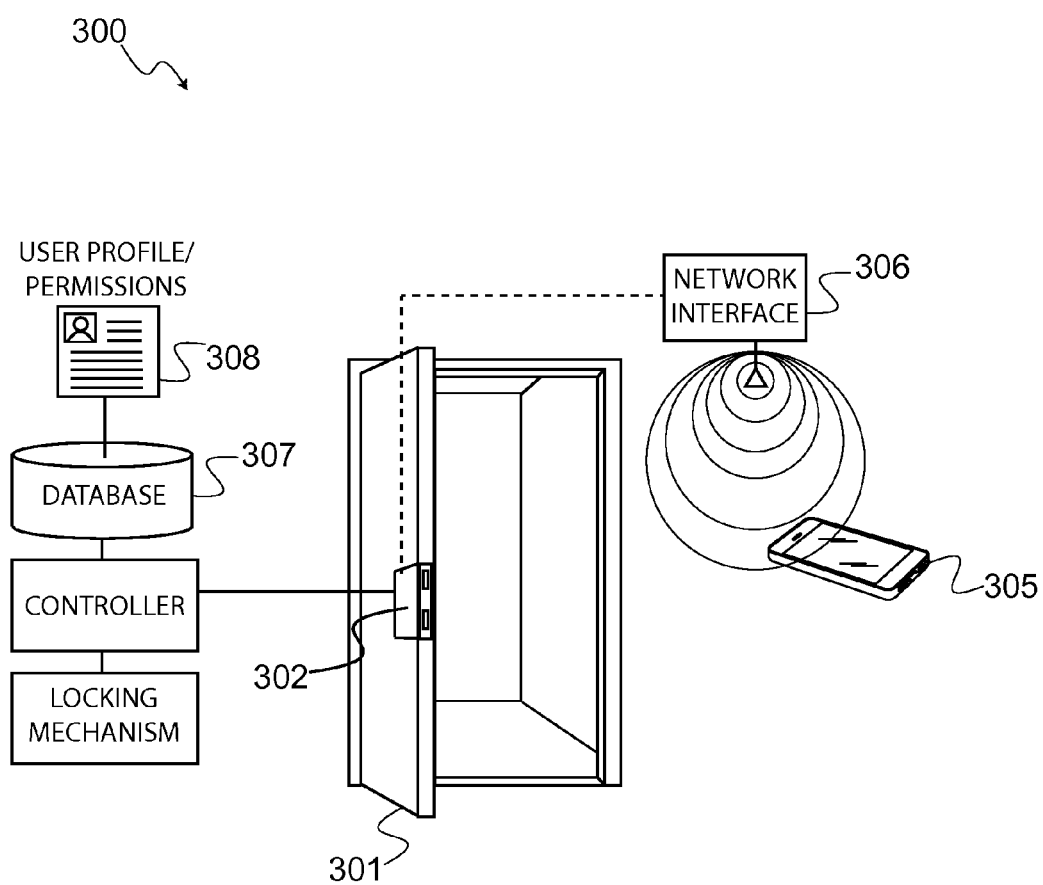
FIG. 3 depicts a system in accordance with one embodiment of the present invention wherein the mobile device comprises a smartphone and the operator comprises a locking mechanism.

Turning now to the next figure, FIG. 3 depicts a system in accordance with one embodiment of the present invention wherein the mobile device comprises a lockable doorway and the operator is a locking mechanism. More specifically, FIG. 3 shows system 300, including barrier 301, operator 302, mobile device 305, and network interface 306. Although similar to system 100, system 300 is designed specifically for indoor type of applications wherein the barriers controlled by the system comprise of doorways or entries into rooms. Such a system may be implemented in university settings, hospital premises, office buildings, or any other facility that may require access control to rooms, storage, or any other spaces that may benefit from controlled access by users.

Barrier 301 may be a lockable doorway into an office, a classroom, a hotel room, a hospital room, a storage room, an employees-only room, an equipment room, a medicine cabinet, or any other space within a building. Alternatively, barrier 301 may be a gate on a sidewalk or passage that is located outdoors or indoors, which leads into or out of a premises.

Operator 302 may include a locking mechanism, such as a magnetic locking system or similar electrical means that causes a locking mechanism to engage and disengage. Whatever the locking mechanism implemented, operator 302 typically includes a network interface 306 for communicating with device 305. Network interface 306 may use an RSSI value in order to provide users with a programmable means of determining a desirable distance at which a command to control barrier 301 may be generated by operator 302 once device 305 is detected and authorized.

In this exemplary embodiment, a user of a mobile device that approaches a locked door, retrofitted with an operator in accordance with the present invention, may be prompted with a request for a password upon reaching a specific proximity to the locked door. This prompt may be displayed on the user's mobile device after the mobile device has been authorized and joined network 304.

Device 305 may include a GUI, which has been provided to the mobile device via a mobile device application. The mobile device application may be downloaded into device 305 from the internet or from a mobile device application server. For example, and without limiting the scope of the present invention, a mobile application may be provided to device 305 via The App Store or any other mobile device host that offers applications for mobile devices.

Although not shown, a larger system with a server with remote access to operator 302 may also be implemented with system 300. Such server may provide a means to manage database 307, include a back-up database, and provide administrative management of barrier 302. As explained above, a server may be useful for implementing a centralized system that allows an administrator to control more than one barrier. For simpler applications however, the server may be excluded from system 100 and operator 302 may be managed by user with administrative permissions. For example, and without limiting the scope of the present invention, mobile device 305 may include a GUI that enables mobile device 305 to access database 307 in order to update permissions, etc. Similarly, the GUI in device 305 may include instructions that facilitate controlling or modifying programmable instructions stored in a controller of operator 302, such as instructions to keep barrier 301 opened, unlocked or accessible to users during a predetermined period—this may include a 7-day timer for unlocking barrier 301 during business hours, a 5-day timer, for locking and unlocking the doorway during certain days, or any other timer that helps the system administrator manage access through barrier 301.

Figure 4:
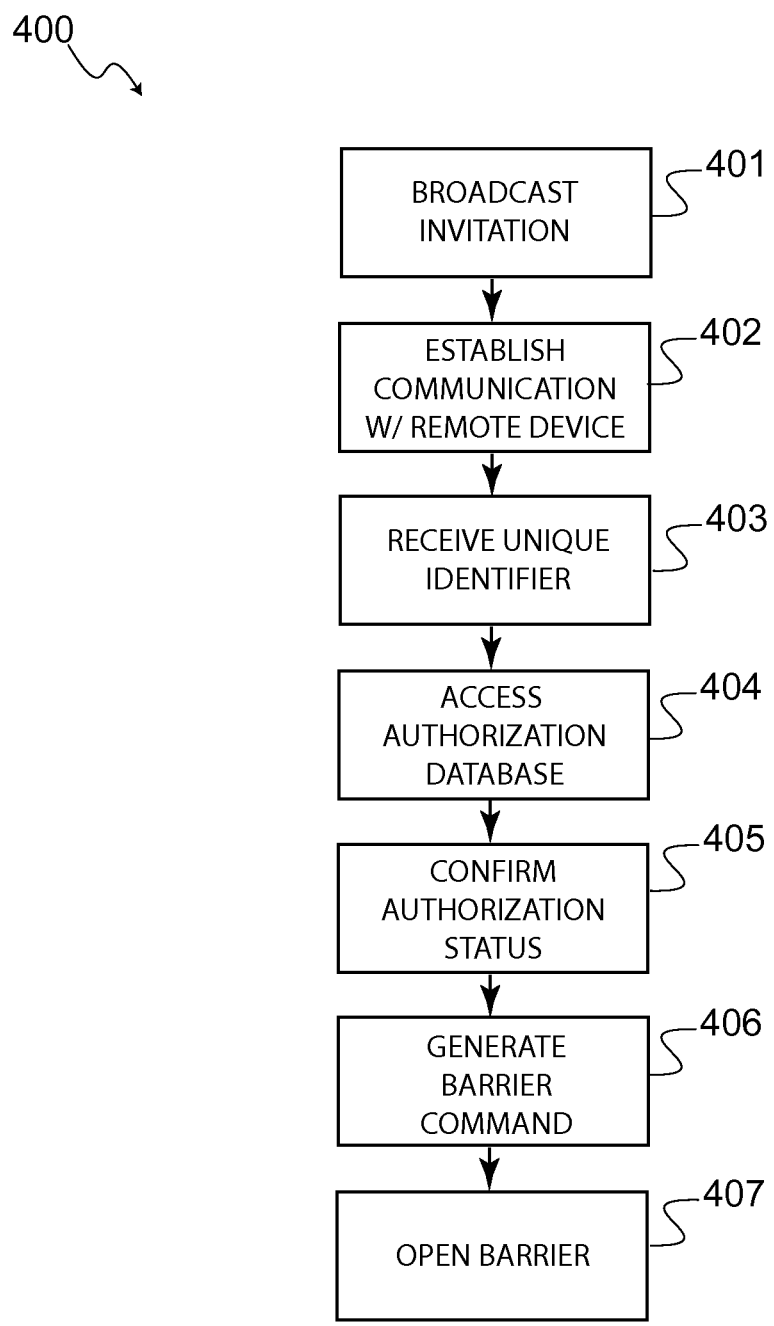
FIG. 4 is a flowchart depicting one method for remotely actuating a movable barrier in accordance with the present invention.

FIG. 4 is a flowchart depicting one method for remotely actuating a movable barrier in accordance with the present invention, wherein an invitation is broadcasted via the operator, which may only be accepted by authorized mobile devices that approach the operator within a programmable proximity. More specifically, method 400 is shown in the following steps, however, it is understood that the process may be achieved in any other conceivable sequence without deviating from the scope of the present invention.

In step 401, an invitation to join a local wireless network may be transmitted from an access point, router, or any communications module or network interface suitable for connecting a mobile device to a local wireless network. In one embodiment, the operator continuously broadcasts the invitation, which only authorized mobile devices may accept. The invitation may be transmitted via one or more access points using protocols such as Wi-Fi™, Bluetooth™, ZigBee™, or any other known technology suitable to connect a mobile device to the local wireless network.

In step 402, an authorized mobile device may send a request to the operator in order to join the network. In one embodiment, prior to joining the network, the mobile device must be authenticated. In some embodiments, connecting to the network may require a prompt to the user requesting authenticating information. In alternative embodiments, if the mobile device does not have adequate authenticating information (i.e. the wrong MAC address or other authenticating information) then the device will be ignored even if the device detects or discovers the access point.

In step 403, an authorized mobile device may provide the authenticating information; for example, the request from the mobile device may include a unique identifier associated with an authorized user. The authenticating information may include a MAC address, a passcode or authorization code provided to the user of the mobile device, or implemented with a mobile application for the mobile device.

In step 404, the unique identifier of the mobile device may be confirmed; this may include accessing a database for permissions associated with a user profile concerning the mobile device. Where the mobile device has the required authorization according to permissions provided in the database, in step 405, the mobile device is authorized. If the mobile device does not have the proper authorization, it may be ignored or a message may be displayed via the GUI on the mobile device informing the user that access has been denied. If the mobile device does have the proper authorization, the mobile device may be allowed access to the local wireless network. In some embodiments, an actuation command or barrier command may be generated in step 406; in other embodiments, a message may be displayed via the GUI of the mobile device informing the user that access has been granted.

In step 406, the operator may be informed that the mobile device has been permitted to join the local wireless network. As such, the operator may generate a barrier command in order to actuate or initiate control of the barrier and provide access. The barrier command may comprise moving the barrier, such as sliding a gate open, or unlocking a doorway such as unlocking a door to a locked office room.

Figure 5A:
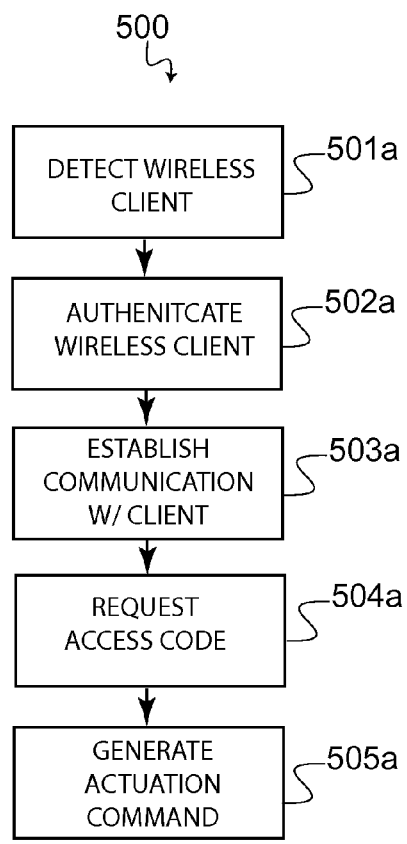
FIG. 5(*a*) is a flowchart depicting one method for remotely actuating a movable barrier in accordance with the present invention, wherein the operator establishes a wireless communication for authorization of a mobile device, the operator configured as a wireless access point.

FIG. 5(a) is a flowchart depicting one method for remotely actuating a movable barrier in accordance with the present invention, wherein the operator establishes a wireless communication for authorization of a mobile device, the operator configured as a wireless access point. Method 500 is shown in the following steps, however, it is understood that the process may be achieved in any other conceivable sequence without deviating from the scope of the present invention.

In step 501*a*, an operator may detect a wireless client mobile device. This may be achieved via any number of wireless protocols such as Wi-Fi, Bluetooth™, ZigBee™, or NFC; as such, the mobile device may be a Wi-Fi client, a Bluetooth™ client, a ZigBee™ client, or an NFC client.

In step 502*a*, an authentication protocol may be initiated by the wireless access point in order to authenticate the client device; In step 503*a* the wireless communication via the wireless medium may be established if the wireless client device is successfully authenticated; In step 504*a*, an access code may be requested via a GUI of the client device; and in step 505*a*, a barrier command to actuate a movable barrier connected to the operator may be generated in order to open, unlock or otherwise control access to through the barrier.

Figure 5B:
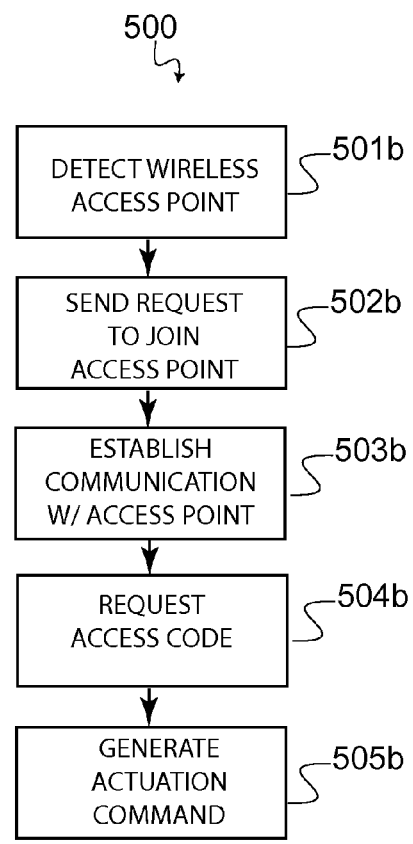

FIG. 5(*b*) is a flowchart depicting one method for remotely actuating a movable barrier in accordance with the present invention, wherein the operator establishes a wireless communication for authorization of a mobile device, the mobile device configured as a wireless access point. In this embodiment of method 500, similar steps may be practiced, although different device configurations are involved.

In this embodiment, the operator is essentially retrofitted as a wireless client device looking to access a wireless access point to which the operator is allowed to access. Similarly, each authorized mobile device is configured as a wireless access point adapted to accept connection requests by the operator.

In step 501*b* the operator will discover a discoverable wireless access point (i.e. authorized mobile device); As with the previous method, this may be achieved via any number of wireless protocols such as Wi-Fi, Bluetooth™, ZigBee™, or NFC; as such, the operator may be a Wi-Fi client, a Bluetooth™ client, a ZigBee™ client, or an NFC client.

In step 502*b*, the operator may send a request to establish communication, the request including an authentication code such as a MAC address, a password, or any other means of authentication. As such, the mobile device may be previously provided with the proper authentication verification information via a mobile application stored in the mobile device; this way, when the operator seeks to join the "access point" the mobile device will have the authentication information necessary to verify and establish communication with the operator.

In step 503*b*, the operator and the mobile device establish wireless communication via the wireless medium. In step 504*a*, an access code may be requested via a GUI of the mobile device; and in step 505*a*, a barrier command to actuate a movable barrier connected to the operator may be generated in order to open, unlock or otherwise control access to through the barrier.

FIG. 6 is a flowchart depicting one method for remotely actuating a movable barrier in accordance with the present invention, wherein the operator establishes a wireless communication for authorization of a mobile device, and wherein the operator may require a user input prior to generating an actuation command to open the barrier. More specifically, method 600 is shown in the following steps, however, it is understood that the process may be achieved in any other conceivable sequence without deviating from the scope of the present invention.

In step 601, the mobile device may be detected. For example, and without limiting the scope of the present invention, this may be achieved by discovering a discoverable device, by discovering an access point, by broadcasting an invitation that may be accepted by authorized devices, or by any other known means of detecting a mobile device via a wireless network interface in proximity to the mobile device.

In step 602, the mobile device may be authenticated by the network interface. In one embodiment, the network interface may include a module for initiating a primary security protocol prior to authenticating the mobile device and allowing it to join the local wireless network.

In step 603, the mobile device may be authenticated and allowed to join the local wireless network. In one embodiment, rather than automatically generating a barrier command, in step 604, a user interface or GUI on the mobile device may be launched. The GUI may include an output requesting an input from the user. This request may require the user to input a password. In another embodiment, the request may include a voice command from the user; the request may include voice recognition to authorize the user before generating the actuation command; in other embodiments, the GUI may provide options for the user to either physically (i.e. touch) or verbally (i.e. speech recognition) provide a command (i.e. open the barrier) before generating a barrier command.

In step 605, the user input may be received from the mobile device. Of course, many other means and options that implement known technologies may be employed with the present invention in order to increase security or improve practicality without deviating from the scope of the present invention. After receiving a user input (i.e. a voice command, a touch command on a screen of a mobile device, etc.) a barrier command may be generated to actuate a barrier.

Figure 7:
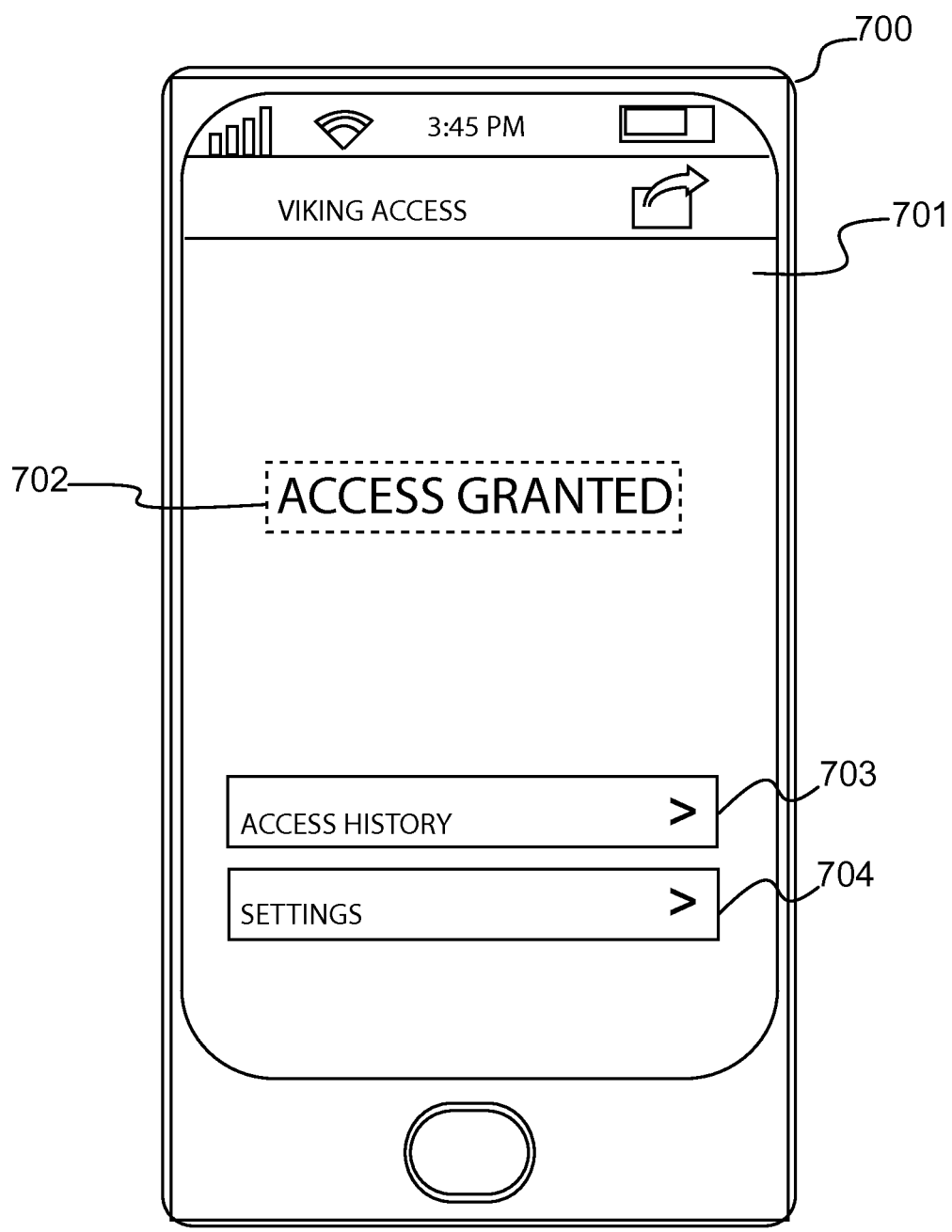
FIG. 7 illustrates output of a graphical user interface on a mobile device, in accordance with one embodiment of the present invention.

FIG. 7 illustrates output of a graphical user interface on a mobile device, in accordance with one embodiment of the present invention. More specifically, mobile device 700 is illustrated with display 701 wherein output 702 is provided along with tabs 703 and 704. Output 702 may be a message or instruction for a user infirming the user of a required action or status. As shown output 702 informs the user that access to through the desired barrier has been granted. This message may be displayed automatically after device 700 is authenticated and joins a network triggering the operator to generate a barrier command to allow access through the barrier.

Tab 703 may provide a user with a means to glean administrative information such as access history. For example, and without deviating from the scope of the present invention, a user may click or select tab 703 in order to see historical data showing which mobile devices accessed the barrier in question and the dates and times that access occurred.

Tab 704 may provide a user with other type of administrative information such as settings information where a user can glean and control parameters of the system. For example, and without deviating from the scope of the present invention, a user may be provided with access to settings such as timers for locking mechanisms, or timers to maintain a barrier open. For example, a user with administrative privileges may access select a time during which to keep a barrier opened or accessible to users—this may include a 7-day timer for unlocking the barrier during business hours, a 5-day timer, for locking and unlocking the doorway during certain days, or any other timer that helps the system administrator manage access through the barrier in question.

Figure 8:
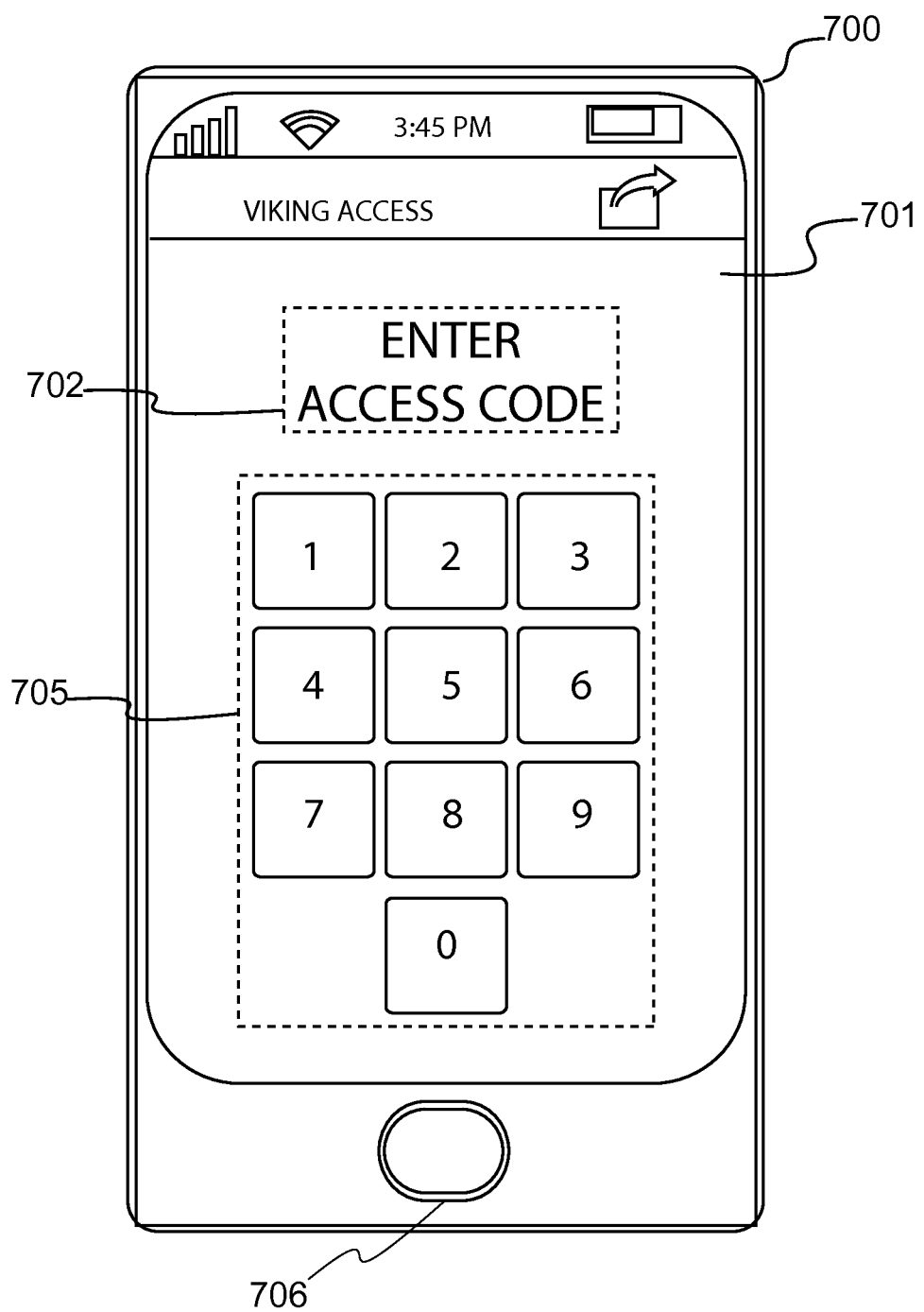
FIG. 8 illustrates output of a graphical user interface on a mobile device, in accordance with one embodiment of the present invention.

FIG. 8 illustrates output of a graphical user interface on a mobile device, in accordance with one embodiment of the present invention. More specifically, FIG. 8 illustrates output 702 wherein a request for authenticating information is required and provided to the user of the mobile device.

In this embodiment, output 702 may display a message such as instructions requesting entry of an access code. In alternative embodiments, the request may be a request to provide biometric information such as a fingerprint on sensor 706 of mobile device 700. As shown, the request for input may include an additional output 705 providing a means to enter authentication—in this example, a numerical passcode to finalize a security protocol and generate a barrier command.

A movable barrier operator with remote monitoring capabilities has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A system for operating a movable barrier from a vehicle, comprising:
    an onboard computer on a vehicle including a wireless network interface configured to connect to a local wireless network, the onboard computer including one or more sets of programmable instructions for:
        detecting a message inviting the onboard computer to join the local wireless network whenever the onboard computer is within a programmable proximity of the movable barrier,
        automatically launching an application, in response to the message, requesting a user input associated with actuation of the movable barrier, and
        sending an access request in response to receiving the user input; and
    a movable barrier operator including:
        a motor mechanically connected to the movable barrier, and
        a controller situated at the movable barrier operator configured to operate the motor and communicate with the local wireless network, the controller including a processor, a memory, and one or more programs stored in the memory to be executed by the processor, the one or more programs include instructions for:
            sending the message inviting the onboard computer to join the local wireless network;
            receiving the access request from the onboard computer;
            detecting whether the onboard computer has joined the local network; and
            automatically generating a movable barrier actuation command in response to the vehicle onboard computer joining the local wireless network.

2. The system of claim 1, wherein the one or more sets of programmable instructions of the vehicle onboard computer further include instructions for:
    determining the distance of the vehicle to the movable barrier using received signal strength indication (RSSI).

3. The system of claim 1, wherein one or more programs stored in the memory of the controller are further for:
    determining the distance of the vehicle to the movable barrier using received signal strength indication (RSSI).

4. The system of claim 1, wherein the local wireless network is a wireless personal area network (WPAN), and the WPAN utilizes the ZIGBEE protocol, the BLUETOOTH protocol, Near Field Communication (NFC), or the WI-FI protocol to communicate with the vehicle onboard computer.

5. The system of claim 1, further comprising a database accessible to the controller of the movable barrier operator, wherein the database includes one or more unique identifiers associated with onboard computer, and wherein the access request includes the one or more unique identifiers.

6. The system of claim 5, wherein the database accessible to the controller of the movable barrier operator further includes one or more sets of temporary user identification codes associated with one or more mobile devices with a temporary authorization to access the movable barrier.

7. The system of claim 5, further comprising a server in communication with the movable barrier operator, the server for managing the database.

8. The system of claim 7, wherein the server includes a user interface for controlling user permissions concerning the one or more unique identifiers associated with the onboard computer.

9. The system of claim 8, wherein the user permissions include a time designation during which the onboard computer associated with the unique identifier may access the movable barrier.

10. The system of claim 8, wherein the user interface further includes a means to provide access to historical data concerning times during which the onboard computer has accessed the movable barrier.

11. The system of claim 1, wherein the invitation for the onboard computer to join the local wireless network includes instructions for automatically launching a graphical user interface (GUI) on the onboard computer.

12. The system of claim 11, wherein the GUI on the onboard computer includes an output requesting a user input for authenticating the onboard computer.

13. The system of claim 11, wherein the GUI on the onboard computer includes an output for displaying historical data concerning times during which the onboard computer has accessed the movable barrier.

14. A method for controlling a movable barrier, comprising:
    transmitting, by a movable barrier operator, an invitation for an onboard computer on a vehicle to join a local wireless network of the movable barrier operator;
    receiving, from the onboard computer, a request to join the local wireless network, wherein the request includes a unique identifier associated with an authorized user;
    launching, by the onboard computer, an application in response to receiving the invitation, the application for requesting a user input associated with actuation of the movable barrier;
    requesting, from the onboard computer, user input comprising user credentials to confirm the identity of the authorized user;
    accessing, by a controller of the movable barrier operator, a database to match the unique identifier and the user credentials to authenticate the onboard computer;
    authorizing the onboard computer and establishing communication between the onboard computer and the local wireless network; and
    generating a movable barrier command in response to the onboard computer joining the local wireless network.

15. The method of claim 14, wherein the database accessible to the controller of the movable barrier operator includes one or more sets of temporary user identification codes associated with one or more mobile devices with a temporary authorization to access the movable barrier.

16. The method of claim 14, further comprising:
    providing, by the movable barrier operator, a user interface for managing the database.

17. The method of claim 14, further comprising:
providing, by the movable barrier operator, a user interface for accessing historical data concerning times during which the onboard computer has accessed the movable barrier.

18. The method of claim 14, further comprising:
including, in the invitation for the onboard computer to join the local wireless network, an instruction to automatically launch a graphical user interface (GUI) on the onboard computer.

19. The method of claim 18, wherein the GUI on the onboard computer includes an output requesting a user input for authenticating the onboard computer.

20. The method of claim 18, wherein the GUI on the onboard computer includes an output for displaying historical data concerning times during which the onboard computer has accessed the movable barrier.

* * * * *